United States Patent
Nicholson

(10) Patent No.: US 7,976,606 B1
(45) Date of Patent: Jul. 12, 2011

(54) FILTER ASSEMBLY WITH INTEGRAL ADHESIVE STRUCTURAL FRAMEWORK

(75) Inventor: Wayne B. Nicholson, Minnetonka, MN (US)

(73) Assignee: GTL, Inc., Minnetonka, MN (US)

( * ) Notice: Subject to any disclaimer, the term of this patent is extended or adjusted under 35 U.S.C. 154(b) by 581 days.

(21) Appl. No.: 11/899,838

(22) Filed: Sep. 7, 2007

(51) Int. Cl.
    *B01D 46/00* (2006.01)
(52) U.S. Cl. ....... 55/524; 55/385.1; 55/385.2; 55/385.3; 55/385.6
(58) Field of Classification Search .......... 55/490, 55/491, 492, 495, 500, 512, 527, 385.1, 385.2, 55/385.3, 385.6, 524; 210/495, 496, 499
See application file for complete search history.

(56) References Cited

U.S. PATENT DOCUMENTS

| | | | |
|---|---|---|---|
| 3,455,367 A | | 7/1969 | Le Tarte |
| 3,458,130 A | | 7/1969 | Juhlin |
| 3,521,630 A | | 7/1970 | Westberg et al. |
| 3,929,704 A | * | 12/1975 | Horning ................. 524/268 |
| 3,941,034 A | | 3/1976 | Helwig et al. |
| 4,028,230 A | | 6/1977 | Rosenblum |
| 4,207,367 A | | 6/1980 | Baker, Jr. |
| 4,340,402 A | | 7/1982 | Catron |
| 4,581,410 A | * | 4/1986 | Donermeyer et al. ...... 525/92 A |
| 4,600,420 A | * | 7/1986 | Wydeven et al. ............ 55/501 |
| 5,216,822 A | * | 6/1993 | Madiedo ..................... 34/82 |
| 5,417,743 A | | 5/1995 | Dauber |
| 5,490,336 A | * | 2/1996 | Smick et al. ................. 34/97 |
| 5,538,545 A | * | 7/1996 | Dauber et al. ............... 96/153 |
| 5,827,340 A | | 10/1998 | Fiske |
| 5,861,630 A | * | 1/1999 | Becker ..................... 250/423 R |
| 5,869,009 A | * | 2/1999 | Bellefeuille et al. ........... 422/171 |
| 5,912,369 A | * | 6/1999 | Reeves ..................... 55/385.1 |
| 6,171,354 B1 | | 1/2001 | Johnson |
| 6,276,426 B1 | | 8/2001 | Polak |
| 6,419,729 B1 | | 7/2002 | Duffy et al. |
| 6,484,789 B1 | | 11/2002 | Ober |
| 6,793,715 B1 | | 9/2004 | Sandberg |
| 6,800,106 B2 | | 10/2004 | Cogar, Sr. et al. |
| 2003/0032700 A1 | * | 2/2003 | Morrison et al. ............ 523/160 |
| 2004/0140067 A1 | | 7/2004 | Kelley et al. |
| 2006/0130690 A1 | * | 6/2006 | Bieber ..................... 101/467 |
| 2006/0235122 A1 | * | 10/2006 | Paul et al. .................. 524/284 |
| 2007/0175195 A1 | | 8/2007 | Skirius et al. |

OTHER PUBLICATIONS

Webster's Ninth New Collegiate Dictionary, 1986.*

* cited by examiner

*Primary Examiner* — Duane Smith
*Assistant Examiner* — Thomas McKenzie
(74) *Attorney, Agent, or Firm* — Moss & Barnett

(57) ABSTRACT

A filter assembly for removing unwanted contaminants and other impurities from a filtrant stream entering the intake region of an underlying device. The filter assembly comprises a filter media appropriate for segregating and separating the impurities and contaminants from the filtrant stream, and a surrounding collar for providing structural support to the filter media that simultaneously provides a self-adhesive material. Such collar is formed from a self-adhesive material, and a binding solution like printers ink, which interact in conjunction with the portion of such filter media not constituting the filtering region, so that the resulting support collar is integrally connected to the filter media, and is non-tacky on its top surface. At the same time, the adhesive retains its adhesive properties on the bottom surface of the collar.

25 Claims, 6 Drawing Sheets

FILTER ASSEMBLY WITH INTEGRAL ADHESIVE STRUCTURAL FRAMEWORK

FIELD OF THE INVENTION

This invention relates to the filtration of unwanted substances from a product stream, and in particular to a filter assembly having an integral framework that is self-adhesive for affixing such filter assembly to the surface of an underlying device.

BACKGROUND OF THE INVENTION

Clean air is critical for many mechanical and electronics environments. For instance, internal combustion engines require the intake of clean air to mix with the fuel to produce the explosion within the piston chamber that provides motor power. Forced-air heating, ventilation, and air-conditioning ("HVAC") systems need a ready supply of air that can be treated within the furnace or air conditioner before it is circulated to a home or work environment. Computers and small electronics devices produce a large amount of heat that must be dissipated by fan-driven air flows.

In order to maintain proper operation of such internal combustion engines, HVAC systems, computers and electronic devices, however, the intake air flow must be filtered in order to remove unwanted particulate materials to protect internal components from abrasion or corrosion, or HVAC-treated air from pollens and other allergens. Thus, a filter assembly is typically secured to the air intake region to reliably remove dirt, dust, pollen, animal dander, and other particulate materials from the air before it enters the intake region.

Filtering media of a number of different constructions are known within the industry. On the one hand, they may be prepared from a woven mesh like a window screen having apertures that allow the passage of air, while preventing the passage of the undesirable particulate materials. Such woven screens can be made from metal or polymeric materials. On the other hand, filtering media may be manufactured from substantially flexible non-woven fibrous pads of either natural or synthetic origin that are capable of entrapping particulate matter contained within the air-flow passing through the filtering media.

Such filtration products commonly comprise an assembly of the filtering media with a support structure surrounding its perimeter. Such support structure may entail a metal, plastic, wood, or cardboard frame or bracket. The frame or bracket provides necessary structural support for the flexible woven or non-woven filtering media. It also provides a convenient means for securing the filter assembly to the air intake region. The support frame of the filter assembly may be secured to the underlying device surrounding the air intake port by means of screws, clips, or other mechanical fasteners. For example, U.S. Pat. No. 6,793,715 issued to Sandberg et al. discloses magnetic straps for attaching a filter to a metal equipment housing.

Alternatively, a glue or adhesive may be used. U.S. Pat. No. 5,827,340 issued to Fiske illustrates the use of double-sided tape used to affix a filter media to the air intake region of an electronics component. See also, U.S. Pat. No. 6,276,426 issued to Polak.

Pressure-sensitive adhesive can also be pre-applied to one surface of the filter media with a removable liner, as illustrated in U.S. Pat. Nos. 3,458,130 issued to Jahlin; 3,521,630 issued to Westberg et al; 4,340,402 issued to Catron; and 6,800,106 issued to Cogar, Sr. et al.

However, such filter assemblies containing self-adhesive support frames require both a frame that must be secured to the filtering media, and the application of pressure-sensitive adhesive to the frame during the manufacturing process. On the other hand, such filter assemblies relying upon double-sided tape prompts the need for an installer to reliably secure the tape to the filter assembly frame before installing the filter device to the underlying device, which can be time consuming, and if not done properly can enable unfiltered air to pass through the crack between the filter assembly frame and underlying device to adversely impact the internal components. Of course, the use of mechanical fasteners or a filter assembly bracket requires precise drilling of holes in the air intake region substrate.

Some efforts have been made within the industry to manufacture filter assemblies without a support frame or bracket. Therefore, U.S. Pat. No. 6,171,354 issued to Johnson discloses a filter for an HVAC system air intake register comprising a piece of filter media to which a pressure-sensitive adhesive is applied across one entire face in a discontinuous pattern, such as multiple dots of adhesive. This discontinuous pattern allows the filter to be secured to the register, while permitting air to pass through the portions of the filter media not covered by the adhesive dots. See also, U.S. Pat. No. 6,419,729 issued to Duffy et al.

U.S. Pat. No. 5,912,369 issued to Reeves teaches a self-adhesive air filter for an electrical component made from a fibrous air filter pad coated on its one face with a special air-permeable, non-drying adhesive like Duro's "All-Purpose Spray Adhesive" composed of n-hexane, dimethyl ether, and acetone). Such a special adhesive is required to offer minimal air flow resistance to the filter media, while releasably securing the air filter to the air intake region of the underlying device.

U.S. Pat. No. 4,600,420 issued to Wydeven et al. illustrates a HEPA filter for a computer disk drive comprising a mesh overlaid on top of the HEPA media. A latex resin is selectively applied to both sides of the non-filtering region of the mesh to fill the voids in the mesh to form a structural support. However, an adhesive ring with a release liner must be separately applied to one face of this latex resin structural support, so that the filter assembly can be secured to the underlying computer cabinet.

While such filter assemblies previously known within the industry may be capable of being affixed to an underlying device, they all require a support frame having pressure-sensitive adhesive or double-sided tape applied thereto, or special air-permeable adhesive or adhesives applied in discontinuous patterns to the entire face of a filter media lacking a support frame. It would therefore be advantageous to provide a filter assembly without a support frame containing an integral support structure that simultaneously supplies the adhesive properties uniformly across the integral support structure for conveniently securing the filter assembly to the underlying device.

SUMMARY OF THE INVENTION

A filter assembly for removing unwanted contaminants and other impurities from a filtrant stream entering the intake region of an underlying device to which such filter assembly is secured is provided by the invention. The filter assembly comprises a filter media appropriate for segregating and separating the impurities and contaminants from the filtrant stream, and a surrounding collar for providing structural support to the filter media that simultaneously provides a self-adhesive material. Such collar is formed from an adhesive material like a pressure-sensitive adhesive, thermoset adhesive, or contact adhesive, and a binding solution like printers ink, which interact in conjunction with the portion of such filter media not constituting the filtering region, so that the resulting support collar is integrally connected to the filter media, and is non-tacky on its top surface. At the same time, the adhesive retains its adhesive properties on the bottom surface of the collar for providing a convenient and reliable means for securing the filter assembly to the underlying device. The invention also provides a method for preparing the filter assembly.

DETAILED DESCRIPTION OF THE PREFERRED EMBODIMENT

Figure 1:
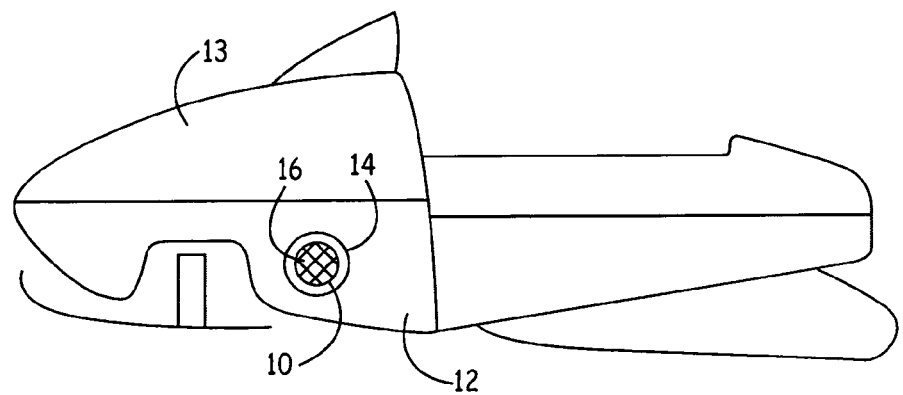
FIG. 1 depicts the filter assembly of the present invention applied to the air intake region of a snowmobile cowling.

A filter assembly for removing unwanted contaminants and other impurities from a filtrant stream entering the intake region of an underlying device to which such filter assembly is secured is provided by the invention. The filter assembly comprises a filter media appropriate for segregating and separating the impurities and contaminants from the filtrant stream, and a surrounding collar for providing structural support to the filter media that simultaneously provides a self-adhesive material. Such collar is formed from an adhesive like a pressure-sensitive adhesive, thermoset adhesive, or contact adhesive, and a binding solution like printers ink, which interact in conjunction with the portion of such filter media not constituting the filtering region, so that the resulting support collar is integrally connected to the filter media, and is non-tacky on its top surface. At the same time, the adhesive retains its adhesive properties on the bottom surface of the collar for providing a convenient and reliable means for securing the filter assembly to the underlying device. This invention also provides a method for preparing the filter assembly.

For purpose of the present invention, "filtrant stream" means any gaseous or liquid material that needs to be filtered in order to segregate or separate unwanted impurities or contaminants prior to the introduction of such filtrant stream to an underlying device. Examples of such filtrant streams include without limitation air; gases like nitrogen, carbon dioxide, compressed air, oxygen, and helium used in industrial processes, or as a propulsive or cooling or ventilation means for operating equipment; and liquids like gasoline, diesel fuel, isopropyl alcohol, cleaning solvents, soaps, or hydrocarbon, fluorocarbon, or other industrial feedstocks used in manufacturing or equipment end-use applications.

In the context of the present invention, "underlying device' means any article of manufacture or equipment to which a filtrant stream is introduced as a material feedstock or a cooling, ventilation, or processing stream. Examples of such underlying devices include without limitation an internal combustion engine or other equipment associated with an automobile, truck, bus, motorcycle, snowmobile, all-terrain vehicle ("ATV"), boat, ship, personal watercraft, aircraft, heavy construction equipment; heat, ventilation, and air conditioning ("HVAC") system; manufacturing equipment like mills, lathes, grinders, saws, routers, and planers; purification equipment; computer or computer component like microprocessors and disk drives; small electronic appliances like hair dryers, vacuum cleaners, televisions, and projectors; respirator masks; medical devices; and applications for the aerospace, military, telecommunications, and optical industries.

As used within this application, "contaminant or impurity" means any solid, liquid, or gaseous material that may cause abrasion, corrosion, deterioration, malfunction, or fouling of parts within the underlying device, or interfere with the quality of the product produced by the underlying device or manufacturing process, or its performance. Such possible contaminants or impurities include, without limitation, particulate materials contained within airstreams provided to cool an internal combustion engine or computer disk drive; snow or water moisture that might affect the performance of a clutch drive belt in a snowmobile or ATV; water or mud that might foul the internal components of an ATV; toxic or otherwise injurious particles or gases that might otherwise pass through a respirator mask; a liquid impurity within a liquid feedstock chemical fed to a manufacturing or mechanical process; protecting outdoor stereo or public address speakers from rain or snow; and water that might undesirably dilute gasoline fed to an internal combustion engine. These are only examples of possible applications of the filter assembly of the present invention, which is intended to cover any undesirable solid, liquid, or gaseous material found within the filtrant stream provided to the intake region of the underlying device.

FIG. 1 shows an environmental view of an application of the filter assembly of the present invention in the form of a filter assembly 10 secured to a cowling 12 of a snowmobile 13. The cowling surrounds the continuous variable transmission ("CTV") clutches and drive belt of the snowmobile to protect the rider from personal injury to his legs, feet, hands, and other body parts. A large quantity of heat builds up within this cowling housing 12 during operation of the snowmobile. Therefore, one or more holes 14 may be bored into the cowling housing defining air intake regions 16 for air to enter the cowling to dissipate the heat produced by the clutches and drive belt. The filter assembly 10 can be quickly and conveniently secured to the exterior of the cowling 12 covering the air intake region 16 by means of an appropriate pressure-sensitive adhesive provided on the peripheral region of the filter assembly 10, as will be explained more fully herein.

Figure 2:
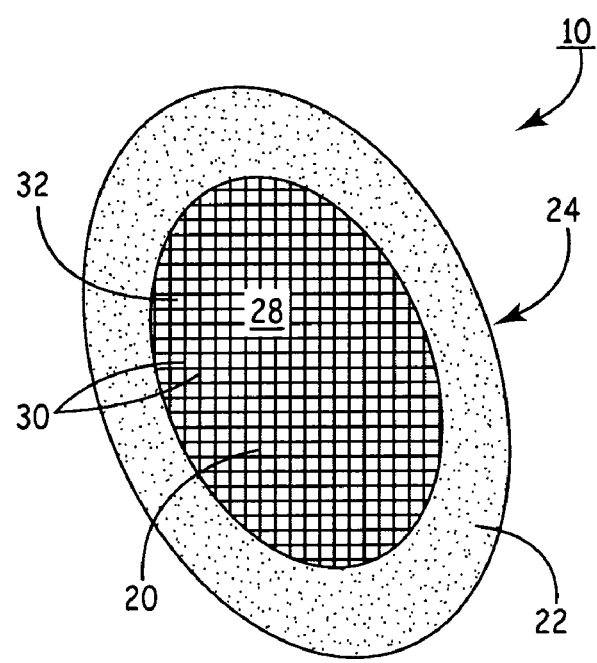
FIG. 2 is a perspective view of the filter assembly of the present invention.

The filter assembly 10 of the present invention is shown more clearly in FIG. 2. It comprises a filter media 20 with a support collar 22 integrally secured to the periphery of the filter media. The collar 22 is impervious to passage of the filtrant stream 24. The filtering region 28 of the filter media 20 defined by the surrounding support collar 22 readily permits passage of the filtrant stream 24, thereby removing the undesirable contaminants and impurities from the filtrant stream 24 in the process.

The filter media 20 may be made from a woven mesh material containing strands or fibers 30 arranged in a crisscrossing or other arrangement for defining apertures 32 of an appropriate size to restrict passage of larger particulate materials. The woven mesh may be made from any material that is appropriate for the filtrant stream 24 and underlying devices, such as metals like aluminum, a polymer like nylon or polyester, a polyolefin (i.e., polyalkene) like polyethylene, or natural fibers like cotton or cellulose. The material should be chosen so that the filtrant stream 24 will not dissolve or otherwise degrade the filter media 20. An example of such a woven mesh filter material for purposes of this invention is the microfiber weave products sold by Sefar AG of Heiden, Switzerland.

The filter media 20 may also constitute a non-woven fibrous pad. Instead of operating like a sieve, as the woven mesh filter does, the randomly disposed fibers 30 of the non-woven fibrous pad entraps solid particles and chemicals within the pad material. Non-limiting examples include the electrostatically charged polypropylene fibers of FILTRETE-brand air filters sold by 3M Corporation of St. Paul, Minn. for HVAC system applications; other polyolefins such as linear low-density polyethylene, poly-1-butene, poly (4-methyl-1-pentene), polytetrafluoroethylene, or polytrifluorochloroethylene; polyvinylchloride; aromatic polyarenes, such as polystyrene; polycarbonates; polyesters; thermoplastic polymers like polylactic acid ("PLA"); non-thermoplastic fibers, such as cellulose, rayon, acrylic, and modified acrylic (e.g. halogen-modified acrylic); polyamide or polyimide fibers like those available under the trademarks NOMEX and KEVLAR from E.I. DuPont de Nemours Company of Wilmington, Del.; and fiber blends of different polymers useful for tribocharging. A high-efficiency particulate ("HEPA") air filter media made from a laminate containing a center layer of glass-covered fibers is useful for computer and electronics applications. For purposes of this invention, the non-woven fibrous pad must be thin enough to enable the adhesive and binding solution components applied from opposite sides of the pad to interact within the pad.

The woven mesh or non-woven fibrous filter pad 20 may be untreated for purposes of this invention. Alternatively, it may be treated with a variety of hydrophobic, oleophobic, or other compounds to change the type of elements that will or will not transfer through the filter media 20. For example, hydrophobic, non-polar molecules like the alkanes, oils, fats, greasy substances, and silicones can be coated on the filter media 20, to prevent water or water moisture contained within the filtrant stream 24 from passing through the filter media. The preferred hydrophobic coating for purposes of this invention is RUCO-GUARD coating sold by Rudolf Chemie AG of Geretsried, Germany. Oleophobic compounds like FC3537 treatment sold by 3M Corporation may be coated on the filter media 20 to thwart oil and other petroleum products from penetrating the filter.

While the filter assembly 10 is depicted in FIG. 2 as a circle, it should be understood that any other shapes like squares, rectangles, triangles, ovals, diamonds, etc. may be used for purposes of this invention. Indeed the shape of the intake region 28 of the underlying device 12 will define the shape of the filter assembly 20 needed to cover it.

The apertures 32 in the filter media 20 can vary in, size, depending upon the dimensions of the contaminants and impurities that should be removed from the filtrant stream 24. As an example, a filter assembly useful for a snowmobile CTV clutch cowl in accordance with this invention contains a filter region contains apertures generally as small as 120 microns.

The support collar 22 of the filter assembly 20 is formed for purposes of this invention from an adhesive material that interacts with a binding solution to produce a solid fill support around a portion of the filter media 20 not constituting the filtering region 28. The adhesive may be chosen from a wide variety of non-removable and removable pressure-sensitive adhesive, thermoset, and contact adhesive materials. Pressure-sensitive adhesives include methacrylic-based adhesives, modified methacrylic adhesives, poly-(alpha)-olefin-based adhesives, synthetic rubber-based adhesives, and silicone-based adhesives. Pressure-sensitive adhesives form a bond when pressure is applied to marry the adhesive with the underlying device surface to which it is affixed. No solvent, water, or heat is needed to activate the adhesive. The degree of bond is influenced by the amount of penetration of the adhesive into the surface. Pressure-sensitive adhesives are designed with a balance between flow and resistance to flow. The bond forms, because the adhesive is soft enough to flow or wet the surface. The bond has strength because the adhesive is hard enough to resist flow when stress is applied to the bond. Once the adhesive and the surface are in close proximity, molecular interactions such as van der Waals' forces also contribute to the bond, which significantly enhance the bond strength. Pressure-sensitive adhesives exhibit viscous and elastic properties, which are used for proper bonding.

Specific examples of pressure-sensitive adhesives useful for the practice of this invention include 3M Corporation's 300 Adhesives Series. The residual adhesive material remaining upon the surface of the collar 22 after interaction of the adhesive with the binding solution should provide appropriate adhesive properties for bonding the filter assembly 10 to the underlying device.

Pressure-sensitive adhesives are usually designed to form a bond and hold properly at room temperatures. Specialty pressure-sensitive adhesives are formulated to function at low temperatures where pressure-sensitive adhesives typically reduce or lose their tack, and at high temperatures where they reduce their shear.

Removable pressure-sensitive adhesives may also be used for the adhesive component of the filter assembly 10 of the present invention. This facilitates the convenient removal of the filter assembly from the underlying device where the end-use application requires the use of different filters at different points in time. An example of such removable pressure-sensitive adhesives includes the A-95 adhesive sold by 3M Corporation.

Thermoset adhesives set as a result of the build up of molecular chains to produce a rigid crosslinked structure. They include epoxy resins, which are some of the most widely used adhesives. There are many different thermoset adhesives available, including phenolic formaldehyde resins, phenolic neoprene, resorcinol formaldehydes, polyesters, polyamides, and epoxy resins. Exemplary manufacturers of thermoset adhesives for purposes of this invention are Bemis Associates Inc. of Shirley, Mass.

Contact adhesives are applied to the surface of both objects to be bonded together, and allowed some time to dry before the two surfaces are pushed together. Some contact adhesives require as long as 24 hours to dry before the surfaces are to be held together. Once the surfaces are pushed together, the bond forms very quickly, so it is usually not necessary to apply pressure for a long time. Natural rubber and polychloroprene (Neoprene) are commonly used contact adhesives. Examples of a contact adhesive for purposes of this invention are the X-5, X-5TC, and X17 elastomeric contact cements sold by Master Bond Inc.

The binding solution component of the structural fill for the support collar 22 may constitute any chemical solution that interacts with the adhesive to providing particle surface to which the adhesive may bind and substantially eliminate tackiness of the adhesive along the collar surface through which the binding solution was applied. Examples of such a binding solution includes ultraviolet; solvent, water, heat-set, or plastisol-based printing inks, as well as silicone solutions. While not wanting to be bound to any particular theory, it is believed that when the adhesive and binding solution are introduced to the filter media 20 from opposite sides, the adhesive travels part way through the apertures 32 in the filter media 20, and naturally binds to the filter fibers 30. The binding solution such as ink coming through the other side of the filter media apertures 32 fills the opening between the filter fibers, and provides additional surface area for the adhesive to bind to. After curing at proper temperature and time, a solid collar structure is produced that is non-tacky on top due to the ink, while exhibiting adhesive properties on the bottom so that the filter assembly 10 can be affixed to the underlying device.

The filtrant stream 24 can pass through the filtering region 28 of the filter assembly 10, since its apertures 32 are not filled with the adhesive/ink-cured substrate. Meanwhile, a separate support frame is unnecessary for the proper support of the filter media 20 as is commonly practiced in the industry, nor is a separate adhesive needed to bind the support frame to the underlying device. In the case of the present invention, the adhesive acts simultaneously as an adhesive along the bottom surface of the filter media 20, and a structural support component near the top surface of the filter media where it interacts with the binding solutions to produce the solid, non-tacky, support collar 22. A process for the manufacture of this filter assembly 10 is shown in FIGS. 3-10.

Figure 3:
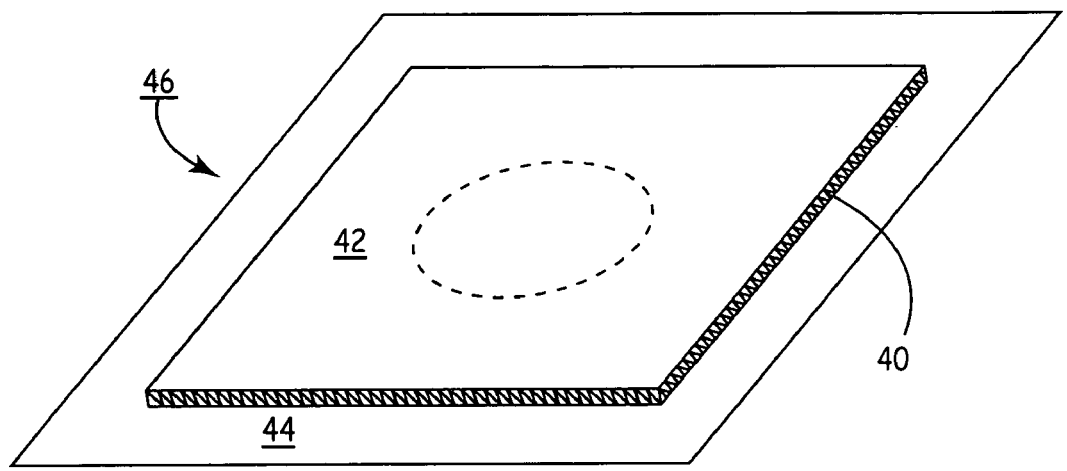
FIG. 3 is a perspective view of the transfer adhesive substrate used to manufacture the filter assembly.

As depicted in FIG. 3, a transfer adhesive scrim 40 is made from, e.g., a 0.5 mil polyolefin sheet to which the adhesive compound is laminated onto both sides by a calendaring, extrusion or rolling process, as is known in the industry. This transfer adhesive "sandwich" 40 is applied to a liner 42 made from a material like silicone that provides peel-away characteristics. A second liner 44 is applied to the other side of the transfer adhesive sandwich 40, so that the adhesive surfaces of the resulting laminated substrate scrim 46 are protected by the silicone liners 42 and 44. Note that an unsupported adhesive (i.e., no scrim) can also be used for this invention.

Figure 4:
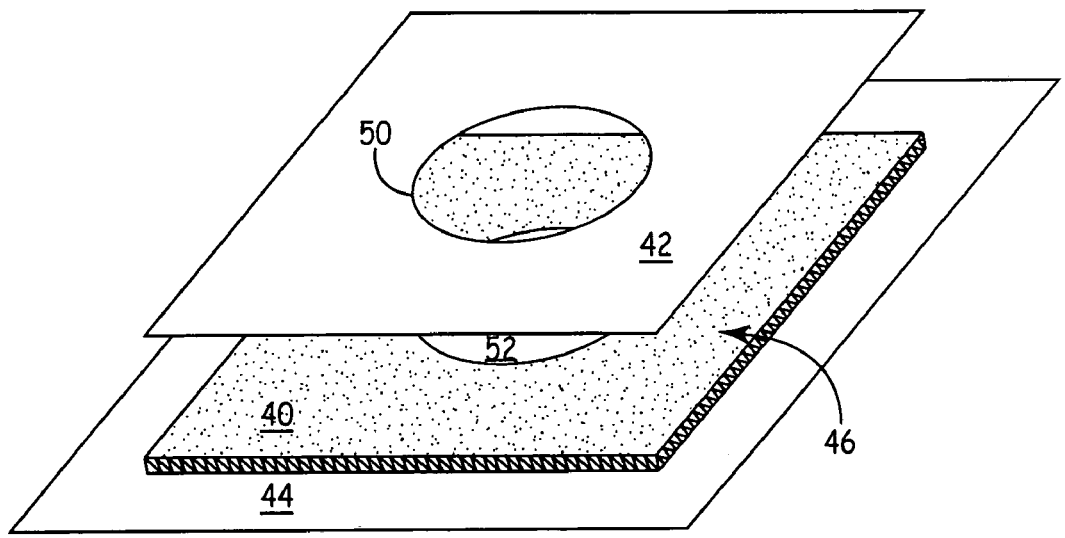
FIG. 4 is a perspective view of the transfer adhesive substrate with the top silicone liner removed.

Next, a die cut 50 is made through the three layers (liner-adhesive-liner) of the laminated adhesive substrate 46, as depicted in FIG. 4. This die cut should reflect the desired size and shape of the filtering region 28 of the filter assembly 10. This die cut should also provide a uniform exterior perimeter sheet dimension, as well as an inner kisscut dimension for an outer framework from which to handle the sheet.

Liner 42 is then removed from the laminated adhesive substrate 46, leaving the exposed transferring adhesive 40 upon liner 44. The die cut circle 52 is left on top of transfer adhesive 40.

Figure 5A:
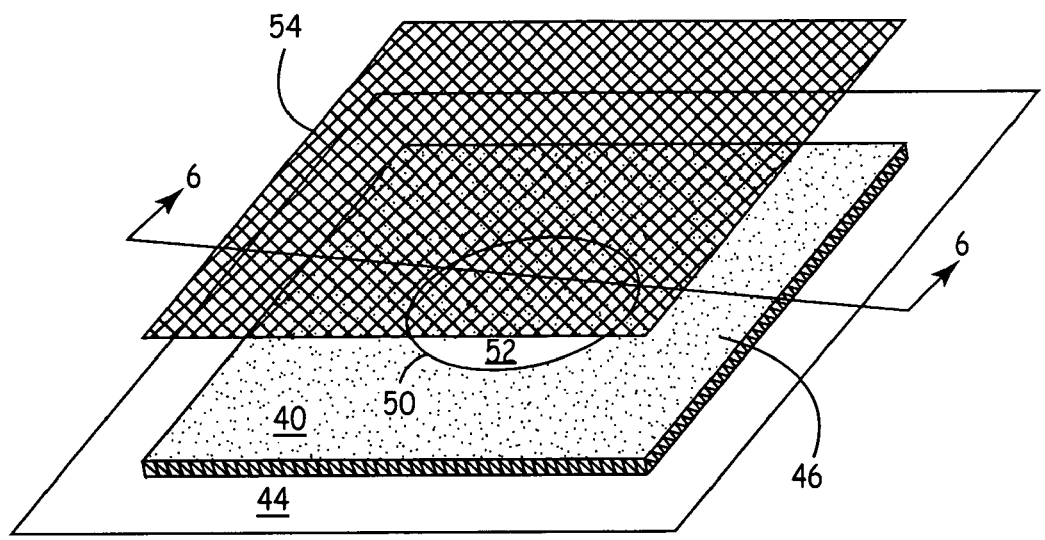
FIG. 5A is a perspective exploded view of the filter media applied to the transfer adhesive substrate with only the inner circular portion of the top liner applied to the top surface of the adhesive to define the filtering region of the filter assembly.
Figure 5B:
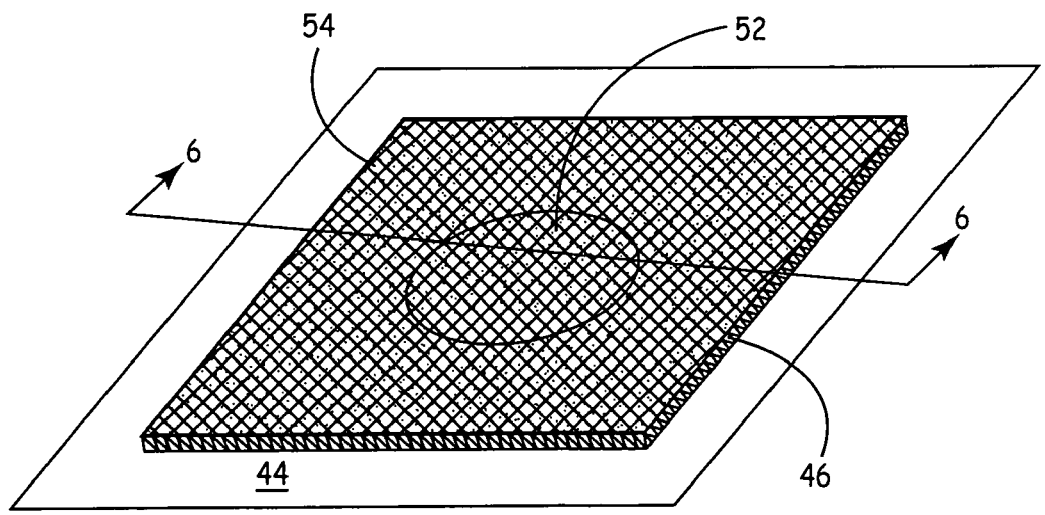
FIG. 5B is a perspective view of the exploded view of FIG. 5A.

The filter media 54 is placed against the adhesive 40 to be bound to bottom liner 44, as illustrated by FIG. 5A. As previously described, this filter media 54 may comprise a woven mesh or a non-woven fibrous pad consisting of metal, polyester, nylon, polyolefin, or natural fibers. The filter media can remain untreated, or be pretreated with a hydrophobic, oleophobic, or other surface treatment suitable for the contaminants or impurities that are to be removed from the filtrant stream 24.

Figure 6:
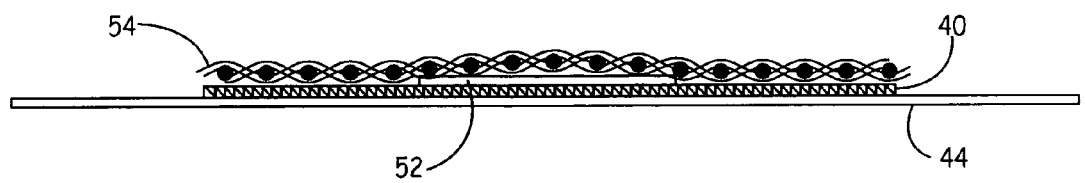
FIG. 6 is a side view of the interim filter assembly construction taken along line 6-6 of FIG. 5B.

Next, pressure is applied against the filter media 54 by means, e.g., or nip rollers, to cause some of the adhesive 40 to penetrate the apertures 32 between the filter fibers 30 of the filter media 20, as shown more fully in FIG. 6.

Figure 7A:
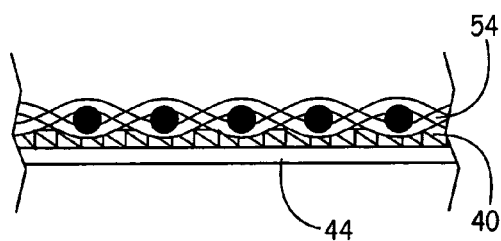
FIG. 7A is a schematic view of the interim filter assembly construction showing the adhesive flowing through apertures within the filter media.
Figure 7B:
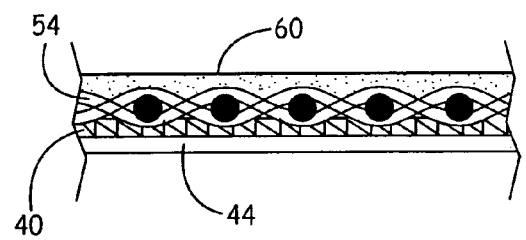
FIG. 7B is a schematic view of the interim filter assembly construction showing the binding solution and adhesive applied to opposite faces of the filter media and interacting therewith.

FIG. 7A depicts the penetration of the adhesive material 40 and its migration into the filter media 54. Binder solution 60, such as printers ink, is then applied to the top side of the filter media 54, as shown in FIG. 7B. The printers ink is preferably prepared as a film emulsion that is applied in a silk screen process by a rubber squeegee to the non-filtering region portion of the filter media 20 to force the ink through the silk screen apertures to interact with the adhesive 40 below the support collar portion of the filter media. The filtering region 28 is protected by a fluid-impervious mask applied to the silk screen mesh. Circle liner 52 below the filter media 20 masks the filtering region 28 portion of the filter media from penetration by the adhesive. The binding solution fills the apertures 32 in the support collar 22 portion of the filter media to provide additional surface area for the adhesive 40 to interact with to encapsulate the filter fibers 30. Once dried or cured, the fibers 30 of the support collar 22 portion of the filter media 20 become encapsulated between the binding solution 60 and the adhesive 40.

Figure 8:
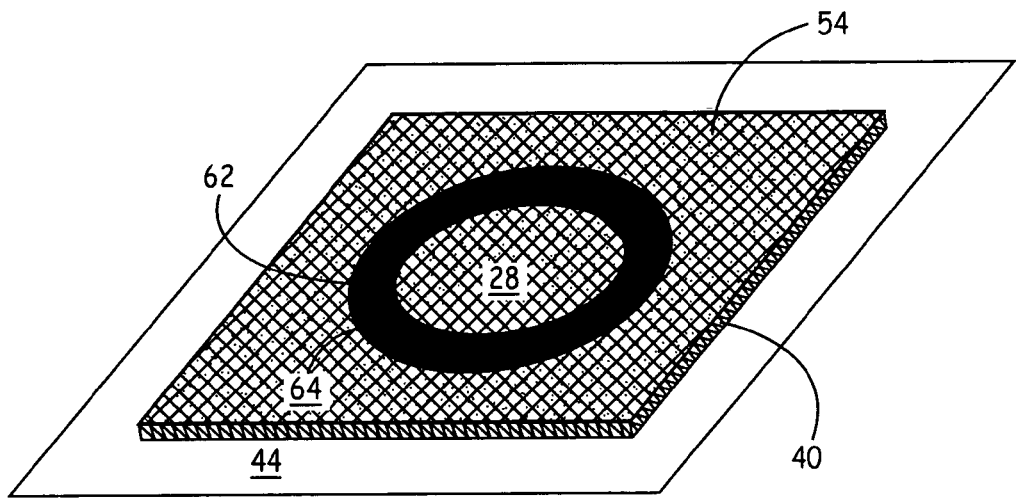
FIG. 8 is a perspective view of the dried and cured filter assembly during manufacture.
Figure 9:
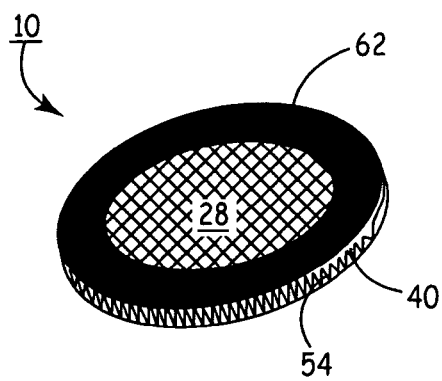
FIG. 9 is a perspective view of the final filter assembly of the present invention.

FIG. 8 shows the resulting filter assembly 10 in which the top surface of the collar 62 produced by the printers ink 60 interacting with the adhesive 40 is non-tacky. In a second die cut step, the outer perimeter 64 of the filter assembly is cut all the way through the filter media 54 and bottom liner 44 to produce final filter assembly 10. The central portion 52 of bottom liner 44 may be readily removed from the filter assembly to leave the filtering region of the filter media fully exposed on both its top and bottom faces, so that a filtrant stream 24 can pass through it.

The above specification and drawings provide a complete description of the structure, manufacturing process, and end-use of the filter assembly 10 of the present invention. However, the invention is capable of use in various of other combinations, modification, embodiments, and environments without departing from the spirit and scope. For example, the binding solution 60 can be applied to the filter media 20 using a spray or extrusion technique, instead of the silk screening method discussed above. Likewise, other possible binding solutions 60 besides printers ink may be used with the adhesive, such as hot melt plastics, urethanes, plastisols, phenolic or UV-cured resins, waxes, rubber-latex resins, RTV silicone elastomers, or epoxies. Such material may also be selected from two-part resins. The manufacturing process should be modified accordingly as dictated by the selected binding solution in order to achieve the required liquid phase and curing aspects of the particular material.

Therefore, the description is not intended to limit the invention to the particular form disclosed, and resides instead in the claims hereinafter appended.

I claim:

1. A filter assembly for affixment to an underlying device covering an intake region within the underlying device for separating unwanted contaminants or impurities from a filtrant stream entering such intake region, such filter assembly comprising:

(a) a filter media having fibers within such filter media defining a plurality of apertures;

(b) a filtering region defined in a central portion of the filter media;

(c) a collar region integrally attached to the filter assembly, such collar comprising:

(i) an adhesive material applied under pressure to the bottom surface of the filter media not constituting such filtering region, so that the adhesive partially penetrates the apertures within the non-filtering region portion of the filter media to a sufficient degree to produce a tacky top surface on the non-filtering region;

(ii) a binding solution applied to the top surface of the non-filtering region of the filter media to partially penetrates the apertures within the non-filtering region of the filter media;

(iii) whereby the binding solution interacts with the adhesive to cause encapsulation of the fibers of the non-filtering region of the filter media, resulting in a non-tacky top surface of the collar, and a tacky adhesive bottom surface of the collar; and (d) a peel-away liner positioned along the bottom surface of the collar to protect the adhesive until the filter assembly is applied to the underlying device.

2. The filter assembly of claim 1, wherein the filter media comprises a woven mesh.

3. The filter assembly of claim 1, wherein the filter media comprises a non-woven fibrous pad.

4. The filter assembly claim 1, wherein the adhesive material comprises a pressure-sensitive adhesive.

5. The filter assembly of claim 1, wherein the adhesive material comprises a thermo-set adhesive.

6. The filter assembly of claim 1, wherein the adhesive material comprises a contact adhesive.

7. The filter assembly of claim 1, wherein the adhesive material comprises a removable adhesive.

8. The filter assembly of claim 1, wherein the adhesive material is selected from the group consisting of methacrylic-based adhesives, modified methacrylic adhesives, poly (alpha) olefin-based adhesives, synthetic rubber-based adhesives, and silicone-based adhesives.

9. The filter assembly of claim 1, wherein the binding solution comprises printers ink.

10. The filter assembly of claim 1, wherein the binding solution is selected from the group consisting of hot melt plastics, urethanes, plastisols, phenolic or UV-cured resins, waxes, rubber-latex resins, RTV silicone, elastomers, epoxies, and two-part resins.

11. The filter assembly of claim 1, wherein the filtrant stream is air.

12. The filter assembly of claim 1, wherein the filtrant stream is a gaseous product.

13. The filter assembly of claim 1, wherein the filtrant stream is a liquid product.

14. The filter assembly of claim 1, wherein the underlying device is an internal combustion engine or associated equipment.

15. The filter assembly of claim 1, wherein the underlying device is an HVAC system.

16. The filter assembly of claim 1, wherein the underlying device is a computer or small electronics product.

17. The filter assembly of claim 1, wherein the underlying device is a respirator mask.

18. The filter assembly of claim 1, wherein the underlying device is a snowmobile CVT clutch cowl region.

19. The filter assembly of claim 1, wherein the underlying device is an air box for an ATV, snowmobile, motorcycle, or personal watercraft.

20. The filter assembly of claim 1, wherein the contaminant or impurity removed by the filter assembly from the filtrant stream is particulate material.

21. The filter assembly of claim 1, wherein the contaminant or impurity removed by the filter assembly from the filtrant stream is pollen, dust, or allergen from air.

22. The filter assembly of claim 1, wherein the contaminant or impurity removed by the filter assembly from the filtrant stream is water moisture from air.

23. The filter assembly of claim 1 further comprising a hydrophobic material applied to the filter media.

24. The filter assembly of claim 1 further comprising an oleophobic material applied to the filter media.

25. A method of preparing a filter assembly for separating unwanted contaminants or impurities from a filtrant stream entering an intake region of an underlying device, such method comprising:

(a) selecting an adhesive compound;

(b) attaching a peel-away liner sheet to each face of the adhesive compound;

(c) cutting the liner-adhesive-liner substrate to define the outer perimeter of the filter assembly and an interior concentric perimeter defining a filtering region of the filter assembly;

(d) removing the top liner sheet from the substrate, except for the portion defined by the interior concentric perimeter cut;

(e) applying to the top surface of the adhesive and on top of the interior concentric perimeter cut liner a filter media having fibers within such filter media defining a plurality of apertures;

(f) applying pressure to the filter media to force the adhesive partially to penetrate the apertures within the non-filtering region of the filter media to a sufficient degree to produce a tacky surface on the non-filtering region; and (g) applying a binding solution to the top portion of the non-filtering region of the filter media to partially penetrate the apertures within the non-filtering region of the filter media, whereby the binding solution interacts with the adhesive to cause encapsulation of the fibers of the non-filtering region portion of the filter media, resulting in a non-tacky top surface of the non-filtering region of the filter media to produce a collar integrally attached to the filter assembly, and a tacky adhesive bottom surface of the collar with the peel-away liner attached thereto to protect the adhesive.

* * * * *